Patented Sept. 9, 1952

2,610,169

UNITED STATES PATENT OFFICE 2,610,169

POLYMERIZATION OF THERMOPLASTIC SILOXANES

James Franklin Hyde and William Herbert Daudt, Corning, N. Y., assignors to Dow Corning Corporation, Midland, Mich., a corporation of Michigan No Drawing. Application October 27, 1948, Serial No. 56,901

4 Claims. (Cl. 260—46.5)

This invention relates to polymerizable organo polysiloxanes and to their polymerization.

There is a great need in certain commercial applications for organo polysiloxanes which are inactive at low temperatures but which polymerize at higher temperatures. More specifically, it is desirable that the siloxane have a definite threshold activation temperature above its melting point. Once the activation temperature is exceeded, the siloxane should polymerize at a reasonable rate. With such a composition the necessity of employing a solvent in order to apply the siloxane to a base member is obviated. Instead, the base member may be dipped into the liquid siloxane composition and thereafter be heated at a temperature above the activation temperature until the adhering siloxane film has been cured. Thus, the cost and hazard which accompanies the use of a solvent in applying siloxane resin coats is eliminated.

It is an object of this invention to provide siloxane compositions and a method for polymerizing siloxanes which involve such a threshold activation temperature. Another object is to provide a catalyst-polysiloxane mixture which can be kept indefinitely in a solvent-free condition without gelling. Another object is to provide a siloxane-catalyst combination which can be maintained in the liquid state at temperatures below 115° C. for prolonged periods of time and set by heating at temperatures thereabove. Other objects and advantages will be apparent from the following description.

In accordance with this invention a hydroxyl-free, thermoplastic organo polysiloxane in which the organic radicals are methyl or aryl and in which siloxane the degree of substitution is from 0.9 to 1.8 organic radicals per silicon atom is polymerized by heating the material at a temperature above 115° C., with a catalytic amount of a metallic salt dispersed therein, until a siloxane which is infusible and insoluble in toluene is obtained. The salts employed are those of a carboxylic acid in which the metal is an alkali metal or lead. These salts are used in amount from one metal atom per 10,000 silicon atoms to one metal atom per 50 silicon atoms.

The organo polysiloxanes employed in the process of this invention are free of hydroxyl radicals and are copolymers containing alternate silicon and oxygen atoms, the silicon atoms having organic radicals attached thereto. These radicals are methyl or aryl. The proportions of the variously substituted silicon atoms is such that the degree of substitution of the siloxane is from 0.9 to 1.8 organic radicals per silicon atom. It is preferred that the organic substituents be methyl and monocyclicaryl radicals.

The above described completely condensed, thermoplastic siloxanes may be prepared by any appropriate method. One method is that disclosed in the applicants' copending application, now U. S. Patent Number 2,482,276 entitled "Preparation of Thermoplastic Polysiloxanes," filed concurrently herewith and assigned to the same assignee as the present invention. In the copending application, it is shown that heat-stable, hydroxyl-free, thermoplastic materials are obtained by heating polysiloxanes in an inert solvent with an alkali metal hydroxide until the siloxane is hydroxyl-free and until the solution reaches a constant viscosity. The alkali metal hydroxide is then removed and the solvent is evaporated.

The catalysts employed herein may be either alkali metal salts or lead salts of carboxylic acids. Such salts include, for example, salts of fatty acids, such as potassium acetate, sodium stearate and lead acetate; salts of alicyclic carboxylic acids, such as lead 2-ethylhexoate and lead naphthenate; and salts of aromatic carboxylic acids such as sodium benzoate.

It is preferred that the salts be used in amount of from one metal atom per 10,000 silicon atoms to one metal atom per 50 silicon atoms. At concentrations below one to 10,000, the rate of polymerization of the siloxane is too slow to be practicable. Concentrations above one to 50 may prove detrimental to the electrical properties of the siloxanes.

The salts may be dispersed in the siloxane by any appropriate method. The solid salt or a solution of the salt may be mixed with the solvent-free siloxane. On the other hand, both the salt and the siloxane may be dissolved in a mutual solvent. In some cases the salt may be formed in situ. This can be done by dispersing either the hydroxide of the metal or the acid in the siloxane and then adding the other. Thus, when the siloxane is prepared by the procedure set forth in the above-mentioned copending application, the alkali employed in treating the siloxane may be neutralized by adding to the solution an excess of a carboxylic acid and the excess acid and the solvent may be evaporated leaving the alkali metal salt of the acid dispersed in the siloxane.

The hydroxyl-free siloxanes containing the salt are polymerized by heating them at a temperature above 115° C. Below that temperature the salts employed in accordance herewith will not cause polymerization. However, above a temperature of 115° C. the siloxane will polymerize to produce infusible, toluene-insoluble resins. Such resins are thermoset. The preferred temperature range for thermosetting the siloxanes defined herein is from 150° C. to 300° C.

The unique and advantageous feature of the present compositions lies in the fact that the polymerization can be started and stopped at will by a simple adjustment of the temperature. Since the catalysts are inactive below 115° C. these compositions may be stored indefinitely without gelation. Most of the siloxanes within the purview of this invention melt below 115° C. Therefore, these compositions can be maintained in a liquid, solvent-free condition for prolonged periods of time. Articles may be dipped in the melted composition and thereby be coated or impregnated without the necessity of using a solvent. Of particular value in such a process are those siloxanes having a degree of substitution of from 1.2 to 1.8.

The process of this invention is readily adaptable to the mass production of coated and impregnated materials. A hydroxyl-free polysiloxane which is liquid at or below 115° C. may be mixed with the catalysts and maintained in the liquid state. Base members are then dipped into the melt and thereafter heated at a temperature above 115° C. to thermoset the siloxane. Since the present catalysts are inactive below 115° C. there is no danger that the siloxane in the dipping bath will become unusable due to gelation.

In order that those skilled in the art may better understand the invention, recourse should be had to the following examples which should be considered as illustrative only.

EXAMPLES

Example 1

A polysiloxane having the composition 33 prime mol percent $(CH_3)_2SiO$, 36 prime mol percent $C_6H_5SiO_{1.5}$ and 31 prime mol percent $CH_3SiO_{1.5}$ was refluxed with KOH in amount of one K atom to 200 silicon atoms in toluene solution until the solution reached a constant viscosity. The siloxane had a degree of substitution of 1.3 organic radicals per silicon atom. The solution was washed with dilute acid and water until neutral. The solvent was removed and the residue was a thermoplastic resin which was free of hydroxyl as determined by the Zerewitinoff method. The siloxane melted at 100° C. and was extremely heat-stable as was shown by the fact that it was still liquid after 14 days at 250° C. The siloxane was thermoset using the catalysts shown below.

Sodium stearate in amount of 0.2 percent by weight was added to a toluene solution of 2 g. of the siloxane. This gives a sodium to silicon atomic ratio of 1 to 300. The solvent was evaporated at 55° C. and the residue was heated at 250° C. whereupon, the siloxane set to a hard, infusible, toluene-insoluble resin in two days.

An isopropanol solution of sodium acetate was added to the solvent-free siloxane in such amount that the sodium to silicon atomic ratio was 1 to 1,000. The mixture was stirred to thoroughly disperse the catalyst, and the isopropanol was removed by evaporation at 55° C. The residue was set to a hard, toluene-insoluble, infusible resin by heating 24 hours at 250° C.

An isopropanol solution of potassium acetate was added to the solvent-free siloxane in such amount that the potassium to silicon atomic ratio was 1 to 1,000. The mixture was stirred to thoroughly disperse the catalyst and the solvent was removed by evaporation at 55° C. The residue set to a hard, toluene-insoluble, infusible resin upon being heated four hours at 250° C.

Lead acetate was added to the solvent-free siloxane in such amount that the lead to silicon atomic ratio was 1 to 1,000. The catalyst was dispersed by agitation and the resin was set to a hard, toluene-insoluble, infusible material by heating four hours at 250° C.

Lead 2 ethylhexoate was added to the solvent-free siloxane in amount to give a lead to silicon atomic ratio of 1 to 1,000. The catalyst was dispersed by stirring the mixture and the resin was found to set to a flexible, toluene-insoluble, infusible resin after six hours at 150° C.

Lead naphthenate was added to the siloxane in amount so that the lead to silicon atomic ratio was 1 to 1,000 and the catalyst was dispersed by stirring. After six hours heating at 150° C., the resin had set to a flexible, toluene-insoluble, infusible material.

In all of the above cases the resin containing the catalysts were not gelled by heating at or below 115° C.

Example 2

A polysiloxane was employed which was composed of phenylmethylsiloxane units, monophenylsiloxane units, monomethylsiloxane units and phenyldimethylsiloxane units in proportions such that it contained 1.5 organic radicals per silicon atom. It was refluxed in a 74 percent toluene solution with potassium hydroxide in amount of one potassium atom per 200 silicon atoms until the solution reached a constant viscosity. The solution was diluted with ether and washed with dilute acid and water until neutral. The solvent was evaporated leaving a residue which was thermoplastic and which was free of hydroxyl as determined by the Zerewitinoff method. This material remained liquid after several days at 250° C.

0.0232 g. of lead 2 ethylhexoate was added with stirring to 4.72 g. of the solvent-free resin. This gives a lead to silicon atomic ratio of 1 to 1,000. The resin set to a toluene-insoluble, infusible state in three hours at 150° C.

Example 3

A mixture of 50 mol percent monomethyltrichlorosilane and 50 mol percent dimethyldichlorosilane was hydrolyzed in benzene solution. The hydrolyzate solution was washed with water until acid free. The polysiloxane was then refluxed in benzene with potassium hydroxide in amount of one potassium atom per 100 silicon atoms for 76 hours. The solution was washed with dilute acid and with water until neutral and the solvent was evaporated. The residue was an oil with a viscosity of 3,460 cs. at 25° C. and was free of hydroxyl as determined by the Zerewitinoff method. The degree of substitution of this polysiloxane was 1.5 methyl radicals per silicon atom. Lead naphthenate was added to the above oil in amount to give a lead to silicon atomic ratio of 1 to 860. The mixture was then heated at 250° C. whereupon the resin set to a hard, toluene-insoluble, infusible material within one hour.

Example 4

When a hydroxyl-free, thermoplastic polysiloxane having the composition 35 prime mol percent monotolylsiloxane units and 65 prime mol percent monomethylsiloxane units is heated at a temperature above 115° C. with potassium benzoate in amount of one potassium atom per 200 silicon atoms an infusible, toluene-insoluble polysiloxane is obtained.

That which is claimed is:

1. A thermosetting composition of matter comprising a hydroxyl-free, thermoplastic organo polysiloxane in which the organic radicals are selected from the group consisting of methyl and aryl radicals, said siloxane having a degree of substitution of from 0.9 to 1.8 organic radicals per silicon atom, and a metal salt of a carboxylic acid in which salt the metal is selected from the group consisting of alkali metals and lead, said salt being present in amount of from one metal atom per 10,000 silicon atoms to one metal atom per 50 silicon atoms.

2. A thermosetting composition of matter comprising a hydroxyl-free, thermoplastic organo polysiloxane in which the organic radicals are methyl and phenyl radicals, said siloxane having a degree of substitution of from 0.9 to 1.8 organic radicals per silicon atom, and a potassium salt of a carboxylic acid in amount of from one potassium atom per 10,000 silicon atoms to one potassium atom per 50 silicon atoms.

3. A thermosetting composition of matter comprising a hydroxyl-free, thermoplastic organo polysiloxane in which the organic radicals are methyl and phenyl radicals, said siloxane having a degree of substitution of from 0.9 to 1.8 organic radicals per silicon atom, and a lead salt of a carboxylic acid in amount of from one lead atom per 10,000 silicon atoms to one lead atom per 50 silicon atoms.

4. A thermosetting composition of matter comprising a hydroxyl-free, thermoplastic organo polysiloxane in which the organic radicals are tolyl and methyl radicals, said siloxane having a degree of substitution of from 0.9 to 1.8 organic radicals per silicon atom, and a potassium salt of a carboxylic acid in amount of from one potassium atom per 10,000 silicon atoms to one potassium atom per 50 silicon atoms.

JAMES FRANKLIN HYDE.
WILLIAM HERBERT DAUDT.

REFERENCES CITED

The following references are of record in the file of this patent:

UNITED STATES PATENTS

| Number | Name | Date |
| --- | --- | --- |
| 2,386,259 | Norton | Oct. 9, 1945 |
| 2,449,572 | Welsh | Sept. 21, 1948 |
| 2,482,276 | Hyde | Sept. 20, 1949 |
| 2,508,196 | Seidel et al. | May 16, 1950 |

OTHER REFERENCES

Chicago Club, Official Digest, November 1945, pp. 424 and 430.